(12) United States Patent
Abbasi et al.

(10) Patent No.: US 6,922,574 B2
(45) Date of Patent: Jul. 26, 2005

(54) MOBILE WIRELESS COMMUNICATION DEVICES WITH INTERNAL ANTENNAS AND REPLACEABLE HOUSINGS

(75) Inventors: Aamir Abbasi, Mundelein, IL (US); Michael Harshbarger, Lake Villa, IL (US)

(73) Assignee: Motorola, Inc., Schaumburg, IL (US)

( * ) Notice: Subject to any disclaimer, the term of this patent is extended or adjusted under 35 U.S.C. 154(b) by 323 days.

(21) Appl. No.: 10/074,160

(22) Filed: Feb. 12, 2002

(65) Prior Publication Data

US 2003/0153281 A1 Aug. 14, 2003

(51) Int. Cl.[7] .............................................. H04M 1/00
(52) U.S. Cl. ............................. 455/575.5; 455/575.7; 455/271; 455/283; 343/755; 343/851; 343/834
(58) Field of Search ...................... 455/25, 63.4, 575.5, 455/575.7, 90.3, 129, 271, 283, 41.1, 66.1, 556.1, 557, 575.1, 575.8, 114.1, 114.2, 97; 343/745, 815–818, 833, 834, 839, 851, 780, 781 R, 782, 850

(56) References Cited

U.S. PATENT DOCUMENTS

| | | | |
|---|---|---|---|
| 4,876,709 A | 10/1989 | Rogers et al. | |
| 5,822,705 A | 10/1998 | Lehtola | |
| 6,016,431 A | 1/2000 | Holshouser | |
| 6,341,217 B1 | 1/2002 | Wong | |
| 2002/0127971 A1 * | 9/2002 | Chen et al. | ................ 455/67.4 |

OTHER PUBLICATIONS

Decision of the Intellectual Property Office of Taiwan, Application No. 092102861, May 20, 2004, 2 pages.

* cited by examiner

*Primary Examiner*—Charles Craver
(74) *Attorney, Agent, or Firm*—Roland K. Bowler, II

(57) ABSTRACT

A wireless communication handset and system having improved antenna performance. The system includes a handset body (300) and multiple housing portions with different antenna loading characteristics, for example different materials or shapes, interchangeably mounted on a common portion of the handset body. The handset body (300) includes electrical communications circuitry coupled to an antenna (314), which is adjacent the interchangeable housing portions. A discrete or integrally formed antenna loading feature compensates for the different antenna loading characteristics of the different housing portions to provide optimal antenna performance regardless of the housing portions mounted on the handset body.

19 Claims, 4 Drawing Sheets

MOBILE WIRELESS COMMUNICATION DEVICES WITH INTERNAL ANTENNAS AND REPLACEABLE HOUSINGS

FIELD OF THE INVENTIONS

The present inventions relate generally to mobile wireless communications devices, and more particularly to mobile wireless communication handsets, for example cellular handsets, having housing portions with antenna loading characteristics, and combinations thereof.

BACKGROUND OF THE INVENTIONS

Cellular telephone handsets having internal antennas are well known and have substantial appeal among consumers, likely because internal antennas are housed completely within the handset body or housing where the antennas are invisible and inaccessible to the user, thus providing communication handsets free of protrusions, which tend to interfere with the comfortable handling and ready storage thereof. Internal antennas having improved performance are thus important, particularly for cellular handsets.

Cellular handsets having replaceable housings and cover portions also have substantial consumer appeal because replaceable housings and cover portions enable consumers to change the cosmetic appearance of the cellular handset at a relatively low cost. Handset platforms having multiple different housings and housing portions interchangeably mountable on a common electronic handset body also have appeal to manufactures, which may use the different housings to differentiate between product lines without changing relatively costly hardware.

Antenna tuning and performance is related generally to the shape, size and composition of the housing, particularly portions thereof that cover portion of the antenna, particularly internal antennas. Thus, depending on antenna type and location, replaceable housings have the potential to affect antenna performance. To compensate for the different loading effects of different housings, the antennas may require tuning to obtain optimal performance, but tuning is a procedure that must be done by the manufacturer or a technician.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

The invention pertains generally to mobile wireless communication handsets having improved antenna performance and to handset systems comprising generally multiple housings or housing portions interchangeably mountable on a common handset body.

In one embodiment the handset body is a generic hardware handset body used in different products lines, which are distinguished by different housings or housing portions mounted thereto and in some embodiments by different software configured features of the handset.

The exemplary handset body is that of a cellular radio handset communications device, although alternatively it could be a 2-way radio device or a satellite based communication radio device or a receiver only, for example a Global Positioning System (GPS) receiver.

Figure 1:
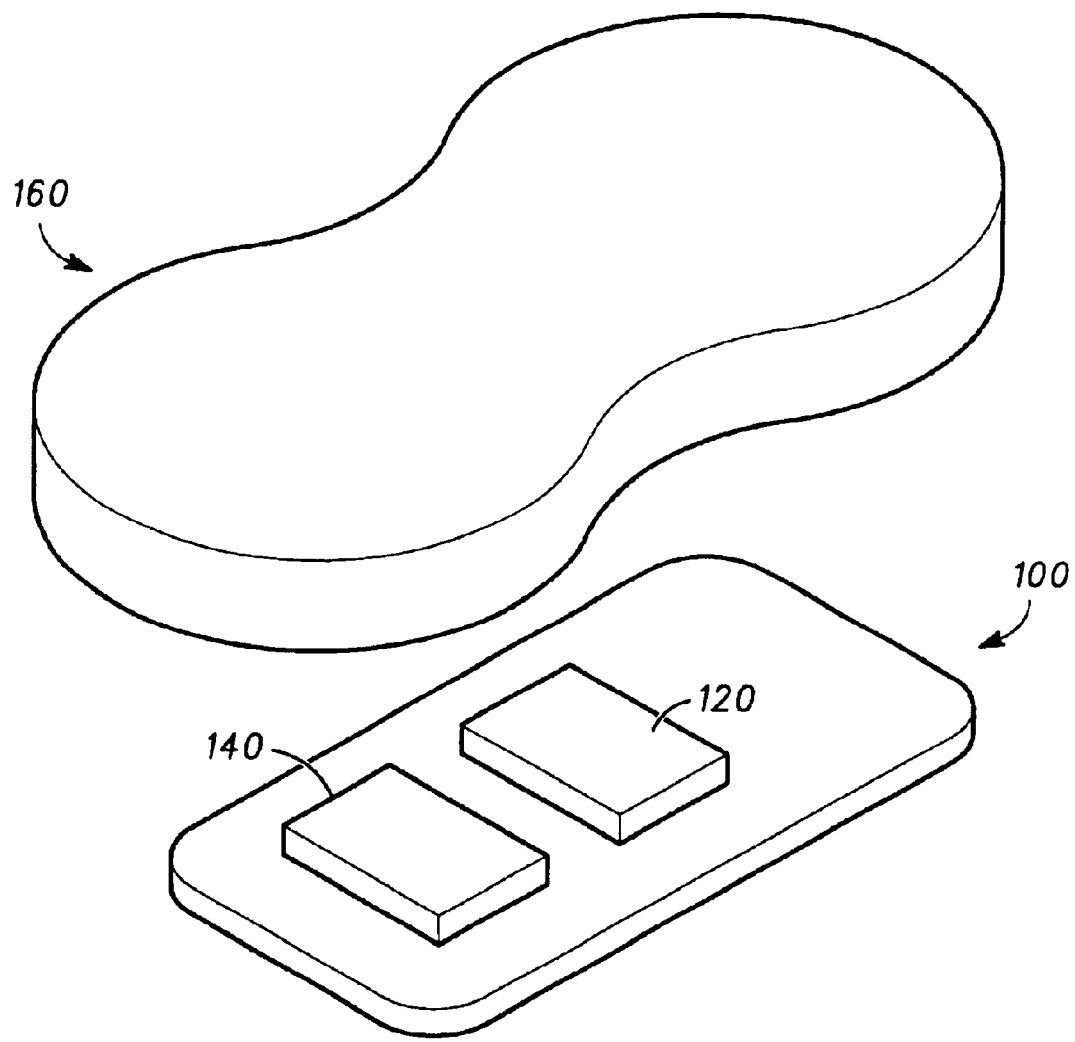
FIG. 1 illustrates a cellular handset body having a radio receiver coupled to an antenna and an interchangeable housing portion having a reference antenna loading characteristic.

The handset body comprises generally electrical communications circuitry coupled to an antenna, and in some embodiments other electrical hardware, including input output circuitry, devices and ports typical of cellular and two-way radios. In FIG. 1, the handset body 100 comprises a transceiver 120 of a 2-way or cellular radio handset, and a housing portion 160 interchangeably mounted thereto. The complementary front-side housing portion is not illustrated in FIG. 1.

Figure 2:
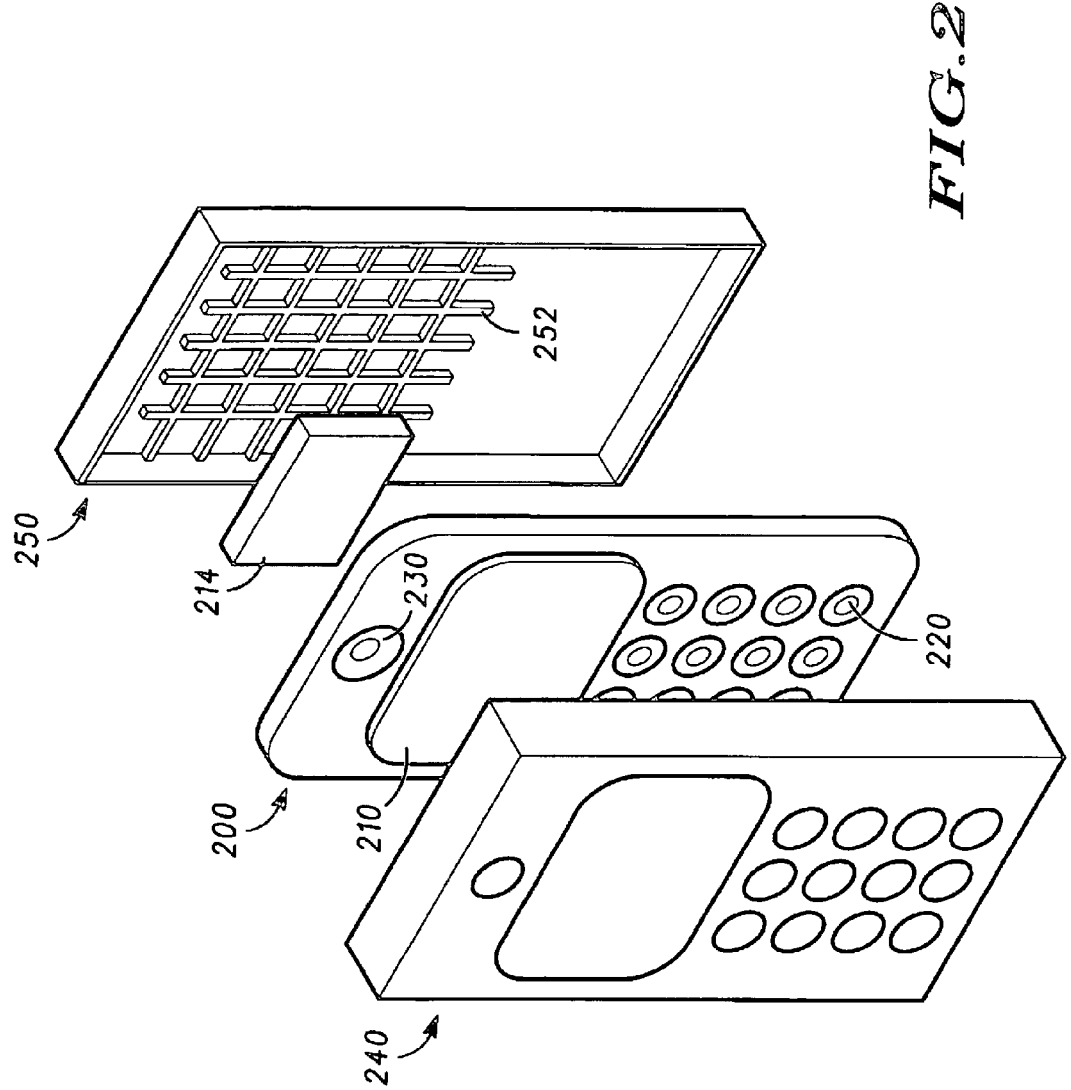
FIG. 2 illustrates a cellular handset body and another interchangeable housing modified to have the same antenna loading characteristic as a reference housing portion.
Figure 3:
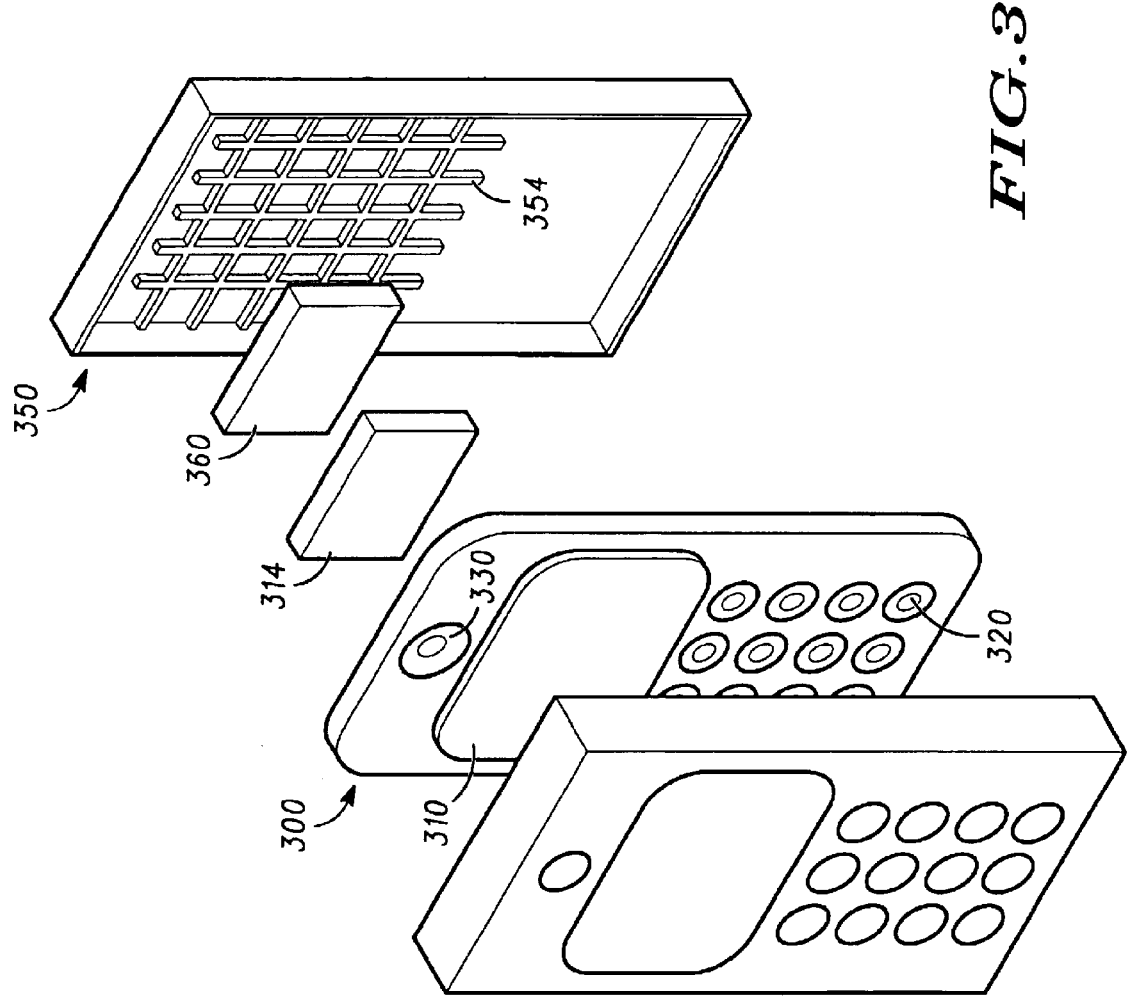
FIG. 3 illustrates a cellular handset body and a third interchangeable housing modified to have the same antenna loading characteristic as a reference housing portion.

In the exemplary cellular handset bodies of FIGS. 2 and 3, the electrical hardware of the handset body 200, 300 includes a display 210, 310 and an array of keypad inputs 220, 320, an audio output 230, 330 and other electrical interface typical of cellular handsets.

The handset bodies of FIGS. 1, 2 and 3 may be identical or substantially identical, and accommodate different interchangeable housings or housing portions. In FIG. 1, the housing portion 160 has a different shape than the housing potions 250 and 350 of FIGS. 2 and 3. The housing portion 160 has a different antenna loading characteristic than the similar housing portions 250 and 350 of FIGS. 2 and 3 resulting from the different shape. Generally, the housing portion 250 and 350 may also have different antenna loading characteristics, despite their similar shapes, resulting from the different materials that constitute the housing portions. The housing portions may be made of different materials, which influence the antenna loading characteristics thereof. The housing portions may also have different finishes, for example a metal flake paint or a metallic deposition finish, which influences the antenna loading characteristic thereof.

In the exemplary embodiment of FIG. 1, the handset body includes an internal antenna 140, for example a planar inverted F antenna, although other internal antennas may be used alternatively. In other embodiments, only a portion of the antenna is internal. In the exemplary embodiments of FIGS. 1–3, an internal antenna 140, 214, 314 is located within the top backside of a candy bar style handset body 100, 200, 300, and the antenna is loaded by the back housing portions 160, 250 and 350 of the phone. The antenna generally includes a portion that is proximate a portion of the interchangeable housing or housing portion mounted on the handset body, wherein the housing portion imparts a characteristic load on the antenna that affects the resonant frequency of the antenna.

In one embodiment, the handset body is part of a system that includes interchangeable housing portions that are mounted on a common portion of the handset body, generally proximate the antenna or a portion thereof. The interchangeable housings generally have different antenna loading characteristics resulting possible from differing shapes and/or some other factor that does not necessarily depend on shape, examples of which were discussed above.

As noted, interchangeable housing portions having different shapes tend to load the antenna differently, resulting in changes in the resonance of the antenna, depending on many variables, including the housing material, thickness and particularly the gap between the antenna and the housing portion.

In FIG. 1, the housing portion 160 has a characteristic antenna loading characteristic on the antenna, dependent generally upon the configuration and mounting relationship of the housing portion 160 relative to the handset body, particularly to the antenna 140 thereof. In the exemplary embodiments of FIGS. 2 and 3, the internal antenna 214, 314 is located within the top backside of a candy bar style handset body 200, 300, and the antenna is loaded by the back housing portions 250 and 350 of the phone.

Although the external appearance of the housings of FIGS. 2 and 3 is identical or substantially similar, the housing portions have different antenna loading characteristics, as discussed above. In the present invention, an antenna loading feature compensates for differences between the different antenna loading characteristics of different antenna housing portions so that any of the housing portions may be mounted handset body without affecting antenna performance and without requiring tuning.

Generally, the housing portion with the greatest loading on the antenna is used as a reference housing. In the exemplary embodiment, the reference housing or housing portion is the housing portion 160 in FIG. 1. The antenna loading character of the housing portion is usually largely dependent on the air gap between the antenna and the internal portion of the reference housing. In one embodiment, the antenna loading characteristic of the interchangeable housing portions, which load the antenna less than the reference housing, are modified to provide the same loading on the antenna as the reference housing. An equivalent approach is to use as a reference housing that with the least antenna loading, and to decrease the loading of the other interchangeable housing portions having greater loading characteristics, if possible, for example by removing material from an inner portion of the housing adjacent to the antenna.

In one embodiment, the antenna loading feature is a portion of the housing wall adjacent the antenna having a different thickness, increased or decreased, relative to the thickness of other housing portions or relative to other interchangeable housings.

Figure 4:
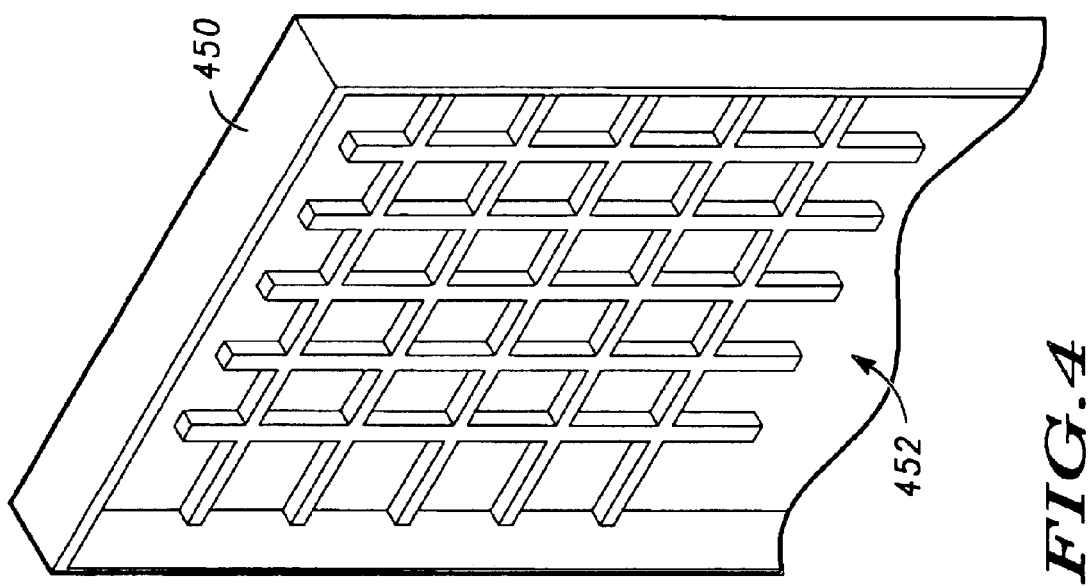
FIG. 4 is a detailed illustration of a housing portion and an exemplary discrete feature for changing antenna loading.

In FIG. 2, the antenna loading feature is an arrangement of molded ribs 252 formed integrally on an internal side portion of the back housing portion adjacent the antenna 214 to make the loading of the housing portion comparable to the dielectric loading of a reference housing. FIG. 4 is a detailed illustration of a ribbed feature 452, which in one embodiment is molded integrally with the housing portion 440. In other embodiments, the ribbed feature may be replaced with an integrally formed solid portion or feature.

In another embodiment, in FIG. 3, the antenna loading characteristic of the housing portion 350 is increased to the reference loading by the addition of a discrete member 360 between an internal side 354 of the second housing portion and the internal antenna 314 when the second housing portion is mounted on the handset body. The discrete member 360 may be aligned and retained or captured in its position with tabs or other structure on either the handset body or preferably on the housing portion to facilitate accurate positioning during assembly.

In one embodiment, the discrete antenna loading feature is a dielectric material besides air. In another embodiment, the discrete antenna loading feature comprises a conductive material, for example a metal conductor, which is separated from the antenna by a dielectric, for example an air gap, or an insulating material.

The loading of the housing portion may be increased also with a combination of discrete and integrated features, for example the ribbed portion and some form of the discrete antenna loading member illustrated in FIG. 3.

In another embodiment, illustrated in FIG. 3, antenna performance is improved by positioning a discrete resonating conductive member, for example element 360, adjacent the internal antenna, spaced apart therefrom by a dielectric, for example an air gap. In systems that include multiple interchangeable housing portions, antenna performance may be improved by positioning a conductive member adjacent the antenna for all interchangeable housing portions, and the antenna loading characteristics thereof may be compensated with another antenna loading feature, for example a discrete and/or integrally formed dielectric material.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A system for a wireless communication handset with interchangeable housing portions, comprising:
    a wireless communication handset body having electrical communications circuitry coupled to an antenna;
    a first housing portion having a first shape and a second housing portion having a second shape, the second shape of the second housing portion different than the first shape of the first housing portion;
    the first and second housing portions interchangeably mounted on a common portion of the handset body,
    the first housing portion loading the antenna with a first load when the first housing portion is mounted on the common portion of the handset body,
    the second housing portion loading the antenna with the same load as the first housing portion when the second housing portion is mounted on the common portion of the handset body.

2. The system of claim 1,
    the antenna is an internal antenna,
    a first internal portion of the first housing portion adjacent the internal antenna when the first housing portion is mounted on the handset body,
    a second internal portion of the second housing portion adjacent the internal antenna when the second housing portion is mounted on the handset body,
    a first external portion of the first housing portion opposite the first internal portion thereof different than a second external portion of the second housing opposite the second internal portion thereof.

3. The system of claim 2, the internal antenna is a planar inverted F antenna.

4. The system of claim 2, the first housing portion has a first antenna loading characteristic, the second housing portion has a second antenna loading characteristic made substantially the same as the first antenna loading characteristic of the first housing portion by an antenna loading feature disposed between second housing portion and the internal antenna when the second housing portion is mounted on the handset body.

5. The system of claim 4, the antenna loading feature is a variation in a portion of the second housing portion adjacent the antenna.

6. The system of claim 4, the antenna loading feature is a discrete member disposed between an internal side of the second housing portion and the internal antenna when the second housing portion is mounted on the handset body.

7. The system of claim 6, the antenna loading feature comprises a conductive material.

8. The system of claim 6, the antenna loading feature comprises a dielectric material.

9. The system of claim 6, the antenna loading feature comprises a recessed portion on an inner side of the second housing portion adjacent the antenna.

10. A wireless communication handset system having interchangeable housing portions, comprising:
   a wireless communication handset body having electrical communications circuitry coupled to an antenna;
   a first housing portion of a first material having a first antenna loading characteristic and a second housing portion of a second material having a second antenna loading characteristic different than the first antenna loading characteristic of the first housing portion,
   the first and second housing portions interchangeably mounted on a common portion of the handset body adjacent the antenna;
   an antenna loading feature disposed between one of the first and second housing portions and the antenna,
   the antenna having a first resonant frequency when the first housing portion is mounted on the common portion of the handset body,
   the antenna having a second resonant frequency the same as the first resonant frequency when the second housing portion is mounted on the common portion of the handset body.

11. The system of claim 10, the first material comprising a first finish with a first antenna loading characteristic, the second material comprising a second finish with a second antenna loading characteristic different than the first antenna loading characteristic of the first finish.

12. The system of claim 11, the first and second housing portions have substantially the same external shape.

13. The system of claim 11, the first finish is a metallic material applied to an exterior of the housing.

14. The system of claim 10, the antenna is an internal antenna, a first internal portion of the first housing portion adjacent the internal antenna when the first housing portion is mounted on the handset body, a second internal portion of the second housing portion adjacent the internal antenna when the second housing portion is mounted on the handset body.

15. The system of claim 10, the antenna loading feature is a variation in wall thickness of the first and second housing portions.

16. The system of claim 15, the antenna loading feature is a discrete member disposed between an internal side of one of the first and second housing portions and the internal antenna.

17. The system of claim 16, the antenna loading feature comprises a conductive material.

18. The system of claim 16, the antenna loading feature comprises a dielectric material.

19. A wireless communication handset, comprising:
   a wireless communication handset body having electrical communications circuitry coupled to an antenna, the antenna an integral part of the handset body
   a housing portion mounted on the handset body adjacent at least a portion of the antenna;
   an antenna loading member disposed between the housing portion and the antenna, at least a portion of the antenna loading member being adjacent an inner surface of the housing portion
   the antenna loading member comprises an electrically conductive material spaced apart from the antenna by a dielectric.

* * * * *